(12) United States Patent
Olson et al.

(10) Patent No.: US 12,451,676 B1
(45) Date of Patent: Oct. 21, 2025

(54) SYSTEM AND DEVICE FOR REDUCING POSSIBILITY OF ACCIDENTAL ELECTRICAL DISCHARGES TO A FISH TAPE DURING USE OF THE FISH TAPE

(71) Applicants: Bradley Allan Olson, Sioux Falls, SD (US); Luke Jeffery Schulte, Sioux Falls, SD (US)

(72) Inventors: Bradley Allan Olson, Sioux Falls, SD (US); Luke Jeffery Schulte, Sioux Falls, SD (US)

(*) Notice: Subject to any disclaimer, the term of this patent is extended or adjusted under 35 U.S.C. 154(b) by 0 days.

(21) Appl. No.: 18/776,976

(22) Filed: Jul. 18, 2024

(51) Int. Cl.
*H02G 1/00* (2006.01)
*H02G 1/08* (2006.01)
*H02G 3/06* (2006.01)
*H02G 3/18* (2006.01)

(52) U.S. Cl.
CPC .......... *H02G 1/083* (2013.01); *H02G 3/0616* (2013.01); *H02G 3/18* (2013.01)

(58) Field of Classification Search
None
See application file for complete search history.

(56) References Cited

U.S. PATENT DOCUMENTS

| | | | |
|---|---|---|---|
| 5,201,495 A | 4/1993 | Crates | |
| 5,236,177 A * | 8/1993 | Tamm | H02G 1/08 254/134.3 FT |
| 5,240,228 A * | 8/1993 | Silveri | E04H 4/169 254/134.4 |
| 6,217,006 B1 * | 4/2001 | Muller | H02G 1/08 361/600 |
| 6,751,829 B2 | 6/2004 | Bergstrom | |
| 6,781,054 B1 | 8/2004 | Sullivan | |
| 10,389,096 B2 | 8/2019 | Pistol | |
| 10,797,474 B1 | 10/2020 | Hall | |
| 2003/0037945 A1 * | 2/2003 | Lagro | H02G 1/086 174/481 |
| 2004/0007700 A1 | 1/2004 | Hazel | |
| 2007/0284984 A1 * | 12/2007 | Oostman | H02G 3/00 312/352 |
| 2010/0021123 A1 * | 1/2010 | Massey | G02B 6/4459 174/660 |
| 2013/0221299 A1 | 8/2013 | Pitucci | |
| 2015/0377838 A1 * | 12/2015 | James | G10K 11/002 73/622 |
| 2017/0256926 A1 * | 9/2017 | Thomas | H02G 3/0675 |
| 2021/0066897 A1 * | 3/2021 | Gell | H02G 1/083 |

FOREIGN PATENT DOCUMENTS

CA 2302800 9/2001

* cited by examiner

*Primary Examiner* — Courtney L Smith
(74) *Attorney, Agent, or Firm* — Jeffrey A. Proehl; Woods Fuller Shultz & Smith P.C.

(57) ABSTRACT

A protective device for reducing the possibility of accidental electrical discharges to a fish tape during use may include a coupler portion configured to be releasably coupled to a connector of an electrical enclosure of electrical infrastructure, and a shield portion configured to receive a free end and end portion of the fish tape from conductive contact with elements in the electrical enclosure, with the shield portion being releasably attached to the coupler portion. A system including various elements of the electrical infrastructure, and a method of utilizing the protective device in the infrastructure, are also disclosed.

20 Claims, 8 Drawing Sheets

SYSTEM AND DEVICE FOR REDUCING POSSIBILITY OF ACCIDENTAL ELECTRICAL DISCHARGES TO A FISH TAPE DURING USE OF THE FISH TAPE

BACKGROUND

Field

The present disclosure relates to electricians' tools and more particularly pertains to a new system and device for reducing the possibility of accidental electrical discharges to a fish tape during use of the fish tape to enhance the workplace safety of tradespeople.

Description of the Prior Art

A fish tape (or an electrician's snake) is a tool used by electricians to assist in placing an electrical conductor, or insulated wire, in electrical conduit as well as other building elements. The fish tape may be initially inserted into the conduit from one (near) end of the conduit and threaded through the conduit to the other (remote) end of the conduit, and then may be used to pull an electrical conductor (or a draw cord) back through the conduit by pulling on the fish tape at the near end.

The fish tape is typically formed of an elongate element that has both a degree of flexibility and a degree of rigidity that allows, by proper manipulation, the tape to be moved through a conduit with various bends or turns. Typically the fish tape is formed of a narrow band of spring steel, although other materials and shapes may be suitable for use to form the fish tape.

The end of the conduit often opens into an electrical enclosure, such as an electrical breaker panel or an electrical junction box typically containing electrical wiring. The free end of the fish tape advancing through the conduit and enters the interior of the enclosure at the remote end of the conduit, which is often outside the view or reach of the electrician.

SUMMARY

In one aspect, the present disclosure relates to a system for reducing the possibility of accidental electrical discharges to a fish tape during use of the fish tape. The system may comprise electrical infrastructure that is configured to be mounted on a building structure and that may include an electrical enclosure which defines an interior and an electrical conduit connected to the electrical enclosure. The electrical conduit may have a lumen in communication with the interior of the electrical enclosure. The infrastructure may additionally include a connector connecting the electrical conduit to the electrical enclosure and having a first end portion positioned in the interior of the electrical enclosure with a second end portion positioned outside of the interior of the electrical enclosure. The exterior surface of the connector may have exterior threads on the first end portion. The system may also comprise an elongated fish tape having a free end and an end portion positioned in the interior of the electrical enclosure. The system may further comprise a protective device removably mounted on the electrical enclosure. The protective device may include a coupler portion releasably coupled to the connector of the electrical infrastructure and a shield portion receiving the free end and end portion of the fish tape to shield the fish tape positioned in the interior from conductive contact with elements in the interior of the electrical enclosure.

In another aspect, the disclosure relates to a protective device for reducing the possibility of accidental electrical discharges to a fish tape during use of the fish tape. The protective device may comprise a coupler portion configured to be releasably coupled to a connector of an electrical enclosure of electrical infrastructure. The protective device may further comprise a shield portion configured to receive a free end and end portion of the fish tape from conductive contact with elements in the electrical enclosure, with the shield portion being releasably attached to the coupler portion.

In still another aspect, the disclosure relates to a method of utilizing a fish tape, and the method may comprise mounting a protective device on an electrical enclosure of an electrical infrastructure. The mounting of the protective device may include providing the protective device with a coupler portion and a shield portion, in which the shield portion is nonconductive, and coupling the coupler portion of the protective device to a connector in an interior of the of the electrical enclosure. The method may also include fishing the fish tape through a conduit connected to the connector of the electrical enclosure. The fishing of the fish tape may include inserting a free end of the fish tape into the conduit such that the free end of the tape moves through a lumen of the conduit and continues to move into an interior of the electrical enclosure, and passing the free end of the fish tape into the nonconductive shield portion of the protective device.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
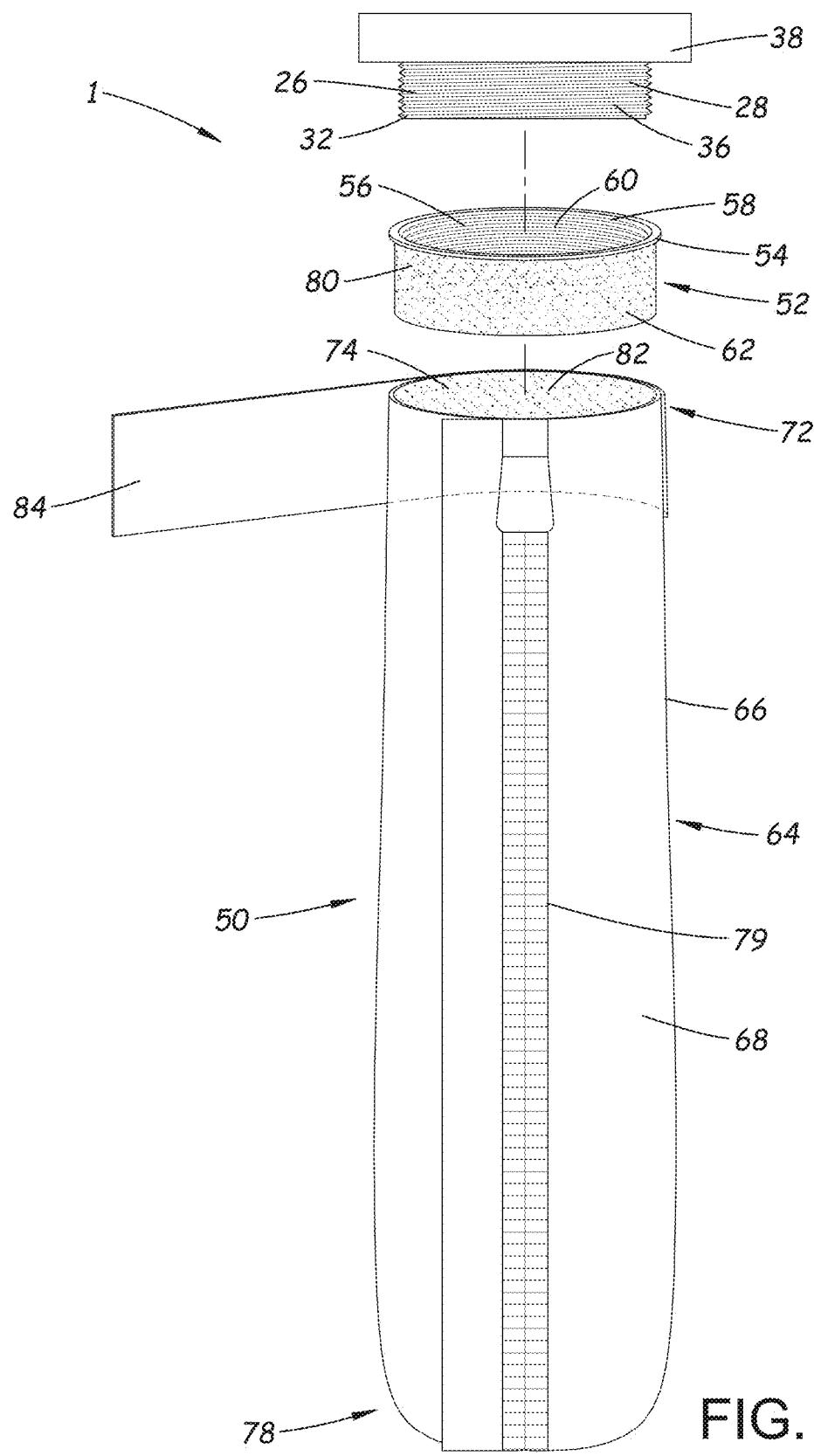
FIG. 1 is a schematic side view of a new system and device for reducing the possibility of accidental electrical discharges to a fish tape during use of the fish tape according to the present disclosure.
Figure 2:
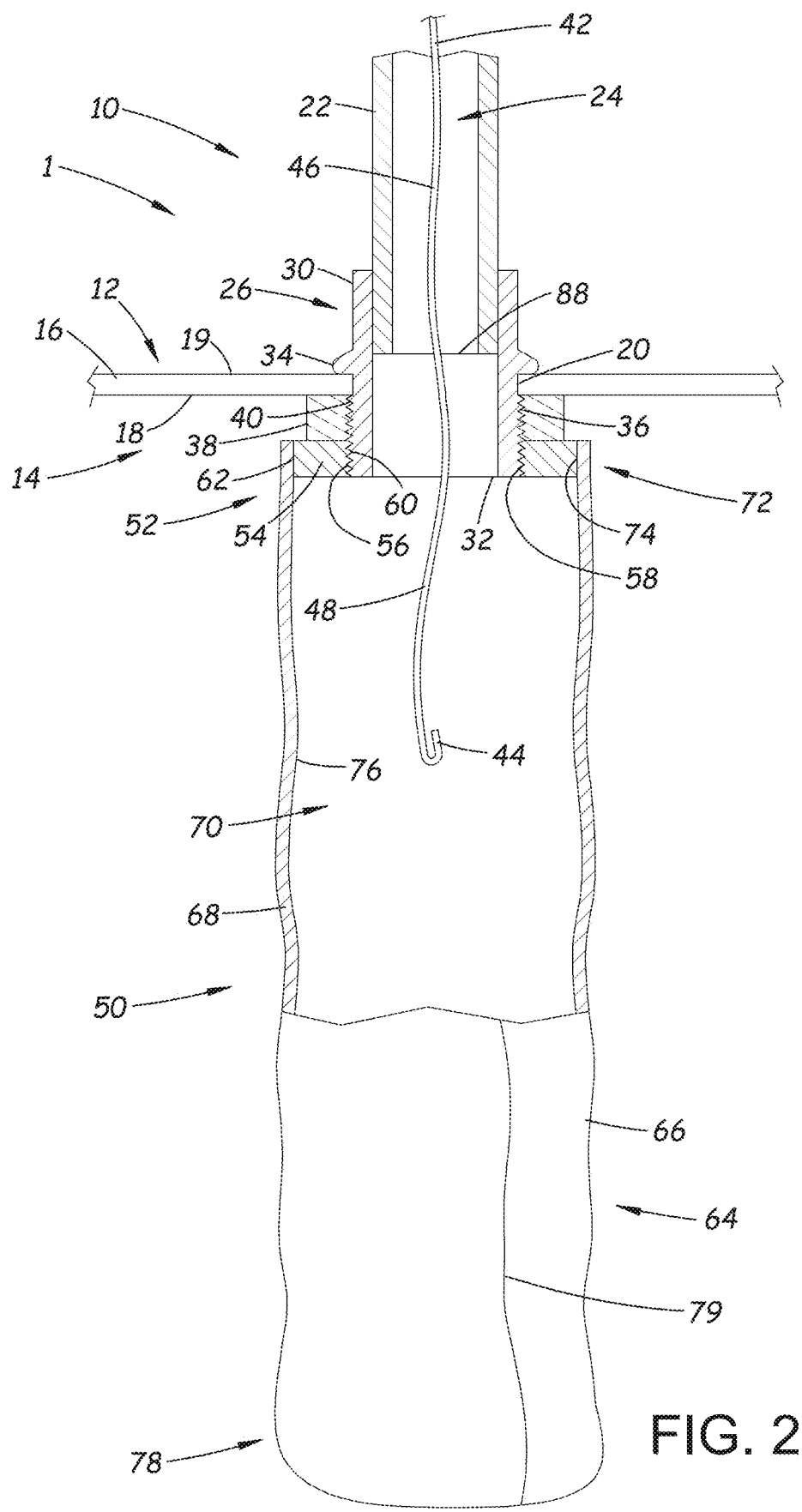
FIG. 2 is a schematic side sectional view of elements of the system including the protective device, according to an illustrative embodiment.
Figure 3:
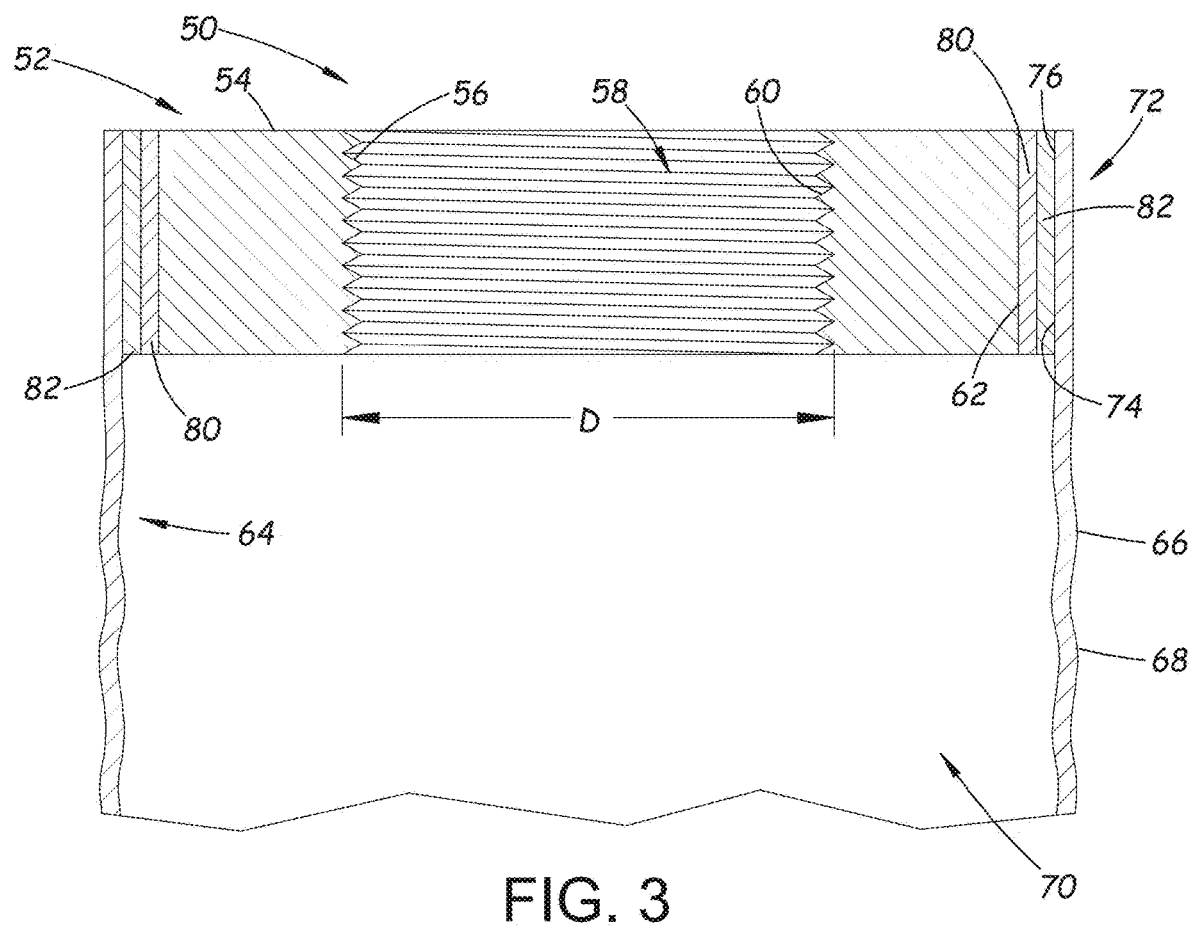
FIG. 3 is a schematic enlarged side sectional view of portions of the protective device, according to an illustrative embodiment.
Figure 4:
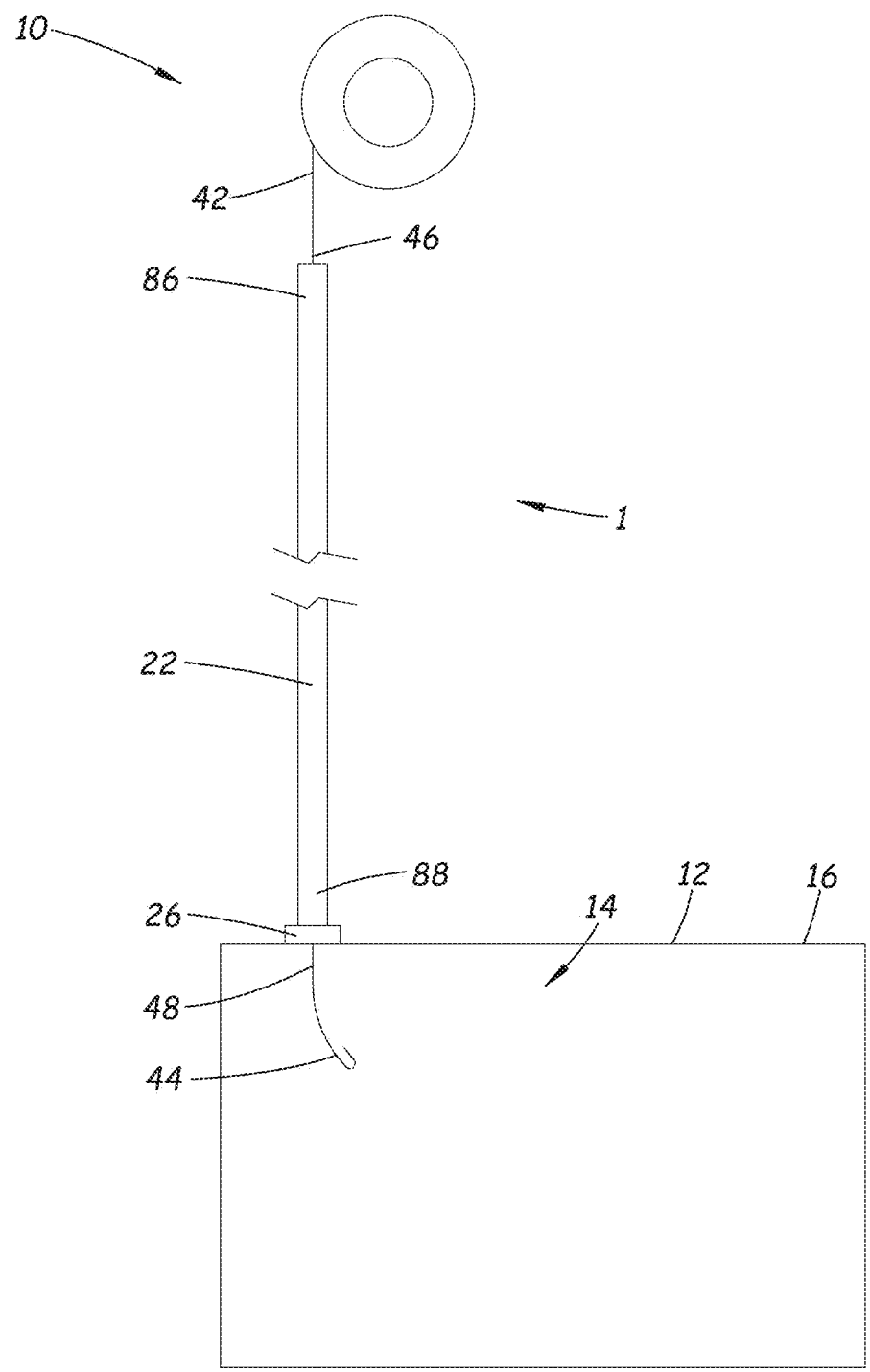
FIG. 4 is a schematic side view of elements of the system, according to an illustrative embodiment.
Figures 5A, 5B:
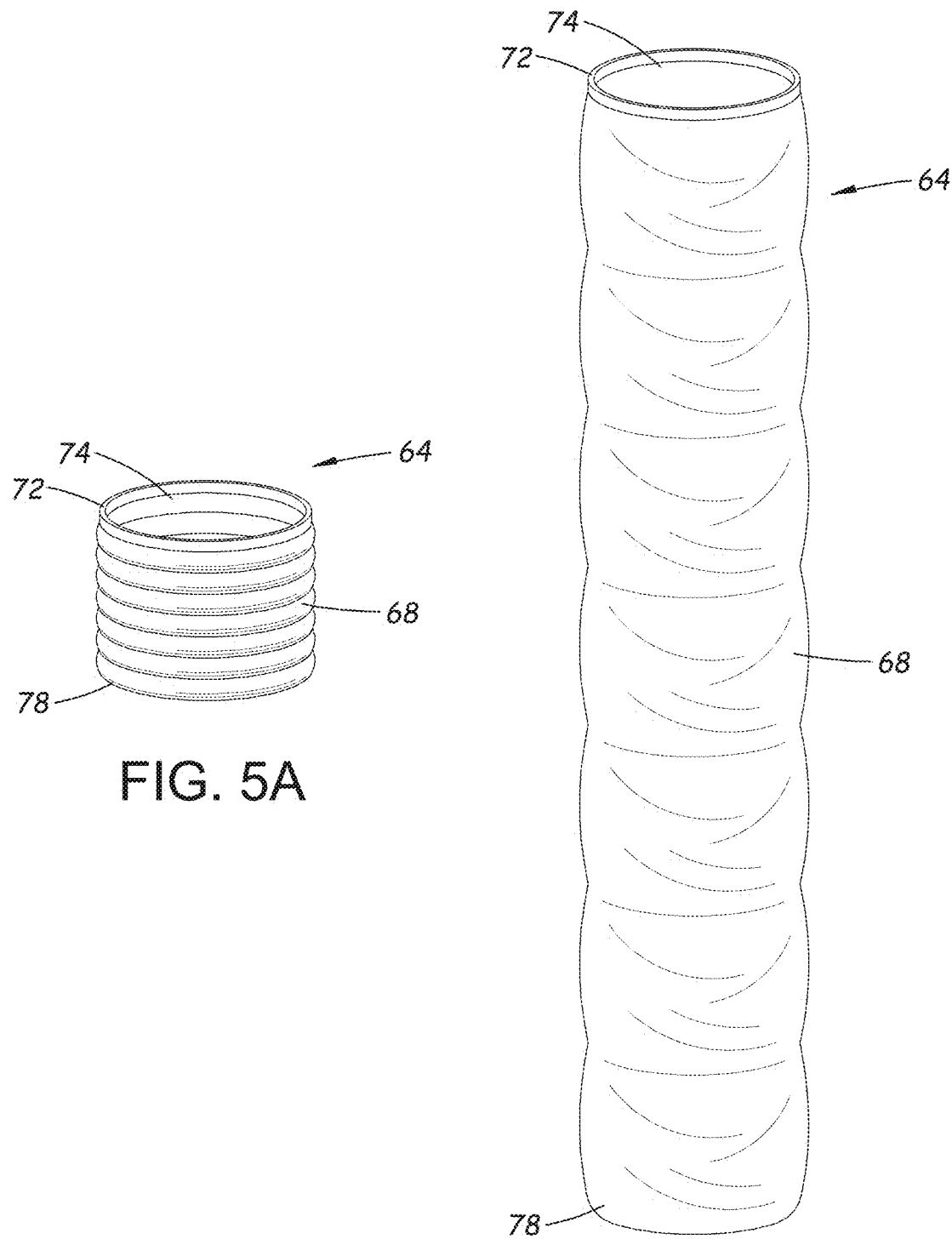
FIG. 5A is a schematic perspective view of an optional embodiment of the shielding portion of the protective device in a collapsed condition.
FIG. 5B is a schematic perspective view of an optional embodiment of the shielding portion of the protective device in an elongated condition.
Figure 6:
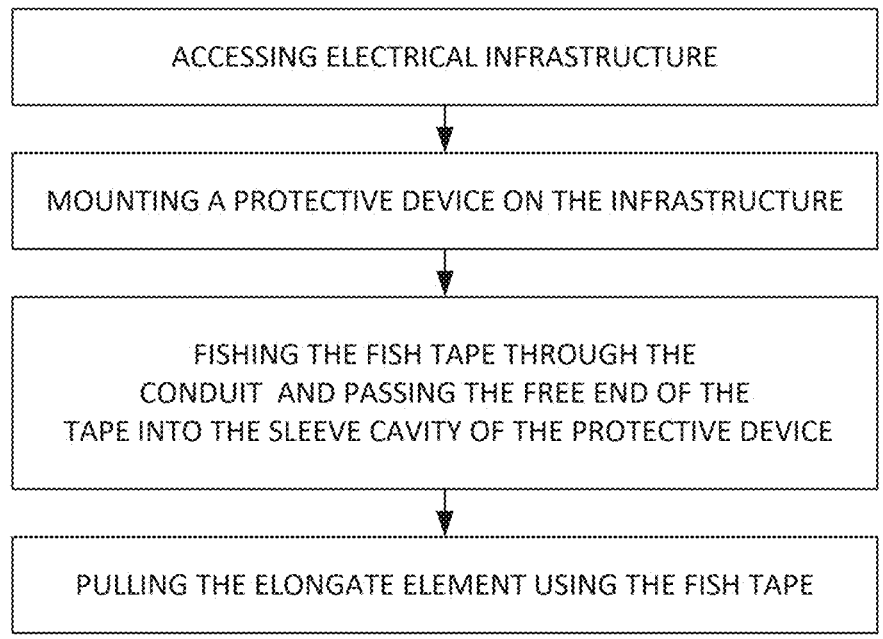
FIG. 6 is a schematic flow diagram of a method, according to an illustrative implementation.
Figure 7:
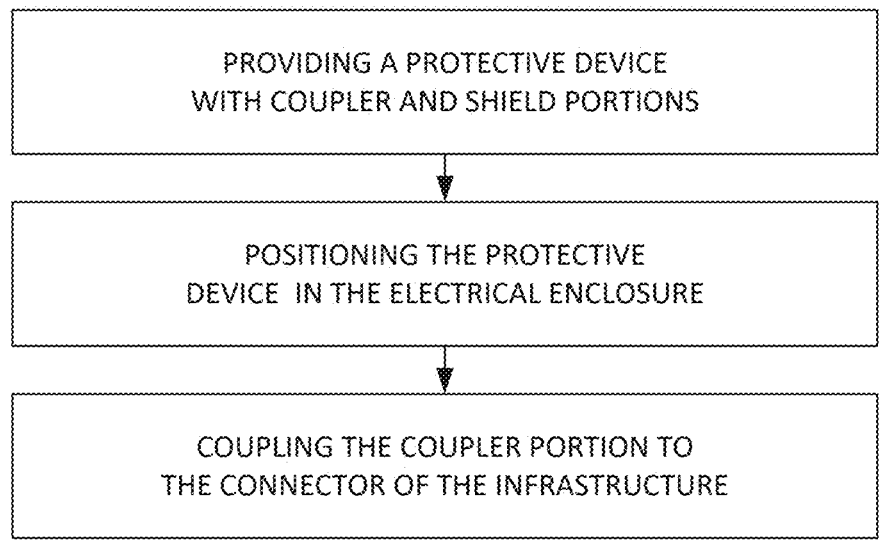
FIG. 7 is a schematic flow diagram with greater detail of the mounting of the protective device, according to an illustrative implementation.
Figure 8:
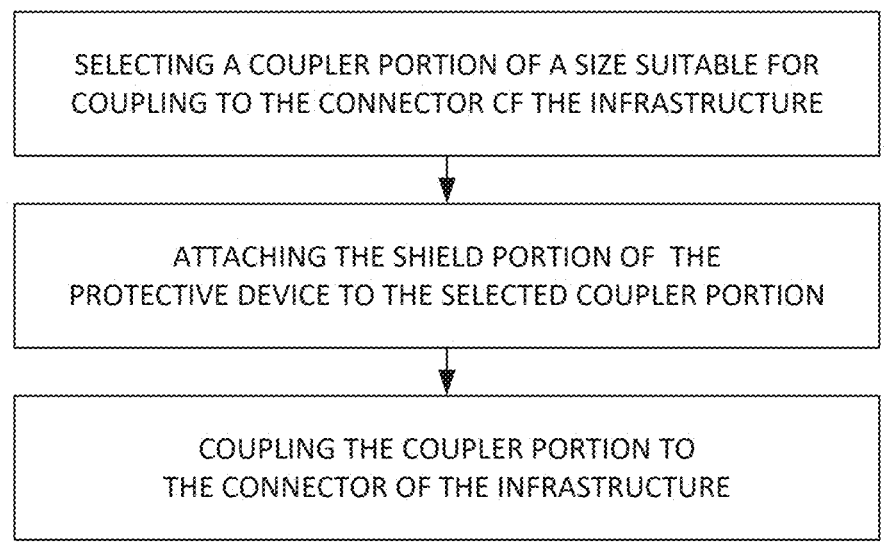
FIG. 8 is a schematic flow diagram with further detail of the mounting of the protective device, according to an illustrative implementation.

With reference now to the drawings, and in particular to FIGS. 1 through 8 thereof, a new system and device for reducing the possibility of accidental electrical discharges to a fish tape during use of the fish tape, and a method of utilizing a fish tape with aspects of the system and device, which embody and implement principles and concepts of the disclosed subject matter will be described.

The applicants have recognized that, under some circumstances calling for the use of a fish tape, wiring or other elements already located in the interior of the wiring enclosure at the remote end of the conduit may be "live" or carrying electrical current. During the fish tape insertion operation, the movement of the end portion of the fish tape through the far end of the conduit and into the interior of the enclosure may result in the end portion coming into contact with (or close proximity to) the electrically live elements in the wiring enclosure.

The applicants have also recognized that, as the fish tape is often formed of a conductive metal, this contact (or proximity) can result in the fish tape (as well as a conduit through which the tape extends) becoming electrically energized though contact or arcing with the energized elements, and may expose the electrician and others to an electrical shock and/or may damage to the electrical circuitry and/or or the building structure.

The applicants have thus developed a protective device for reducing the possibility of accidental electrical discharges to a fish tape during use of the fish tape, such as by reducing the possibility of an end of the tape coming into contact with an electrically charged element in an electrical enclosure during the use of the tape.

In some aspects, the disclosure relates to a protective device 50 alone, and in other aspects, the disclosure relates to a system 1 that includes the protective device and other elements environmental to the use of the device 50.

The system 1 may include electrical infrastructure 10 which is typically configured to be mounted on a building structure, although other utilizations are possible. In illustrative embodiments, the electrical infrastructure 10 may comprise an electrical enclosure 12 that defines an interior 14 of the enclosure, and may be formed by an enclosure wall 16 that extends about at least a portion of the interior. The enclosure wall 16 may have an inner surface 18 facing inward toward the interior 14 and an outer surface 19 facing outwardly with respect to the interior. At least one knockout hole 20 may be formed in the enclosure wall that extends between the inner 18 and outer 19 surfaces of the enclosure wall. Often, the enclosure 12 includes a plurality of the knockout holes 20. Illustratively, the electrical enclosure 12 may comprise an electrical breaker panel or box for holding electrical breakers or other electrical components, or an electrical junction box for containing the connections between electrical conductors.

The electrical infrastructure 10 may also include an electrical conduit 22 connected to the electrical enclosure 12. The electrical conduit has a lumen 24 or interior for receiving water more electrical conductors, and the lumen is in communication with the interior of the electrical enclosure. Typically, the electrical conduit 22 is elongated between a near end 88 located at the electrical enclosure 12 and a remote end 86 located remote with respect to the electrical enclosure. Illustratively, the distance between the near and remote ends of the conduit is at a minimum approximately 3 feet, but is typically several feet and may be 10 or 20 or even more feet.

The electrical infrastructure 10 may further include a connector 26 which physically or mechanically connects the electrical conduit 22 to the electrical enclosure. The connector 26 may extend through the knockout hole 20 in the enclosure wall of the enclosure. The connector 26 may be tubular in character for receiving a portion of the electrical conduit, such as an end of the connector, and has an exterior surface 28. The connector 26 has opposite end portions, with a first end portion 30 being positioned in the interior 14 of the electrical enclosure and a second end portion 32 being positioned outside of the interior of the enclosure 12. In some embodiments, the exterior surface 28 of the connector has a shoulder 34 positioned between the first 30 and second 32 end portions, and the shoulder may be positionable against the outer surface 19 of the enclosure wall. The exterior surface 28 of the connector may have exterior threads 36 formed on the first end portion 30.

The electrical infrastructure 10 may include a connector nut 38 which is mounted on the first end portion 30 of the connector, and may be threaded on a first section 40 of the exterior threads of the first end portion. A second section of the exterior threads 36 of the first end portion may be left exposed, as not being engaged by the nut 38.

Embodiments of the system 10 may include a fish tape 42 that is elongated between a free end 44 and a coiled end. The fish tape 42 may have a medial portion 46 of the fish tape that is positioned in the lumen 24 of the electrical conduit during use of the tape, and has an end portion 48 of the fish tape that may be positioned outside of the conduit lumen, and in the interior 14 of the electrical enclosure, during tape use. The fish tape 42 may be formed of a conductive metal, such as spring steel, to facilitate the manipulation of the tape, and the free end 44, in a conduit.

The protective device 50 may be configured to be mounted on the electrical infrastructure 10 during use of the device, and during the usage of the fish tape, particularly during the portion of usage when the fish tape is initially being placed in the lumen of the conduit, such as prior to withdrawing the fish tape back through the conduit to pull the electrical conductor or other elongate element.

In the illustrative embodiments, the protective device 50 may include a coupler portion 52 which is configured to hold the device in position with respect to the conduit during use of the device. Illustratively, the coupler portion 52 may releasably connect to the connector 26 of the electrical infrastructure. The coupler portion 52 may be configured to receive a section of the second end portion 32 of the connector, and may do so in a manner that removably secures the device 50 to the connector of the infrastructure. Illustratively, the coupler portion 52 may have a nonconductive surface, and may be formed from a nonconductive material, such that contact between the coupler portion 52 and the connector of the infrastructure does not support electrical conduction.

In exemplary embodiments, the coupler portion 52 may comprise an annular member 54 which may be substantially circular in shape. The coupler portion 52 may have an inner surface 56 that defines a coupler opening 58, and the coupler opening may be substantially circular with a diameter D dimension. The inner surface 56 may have interior threads 60 formed thereon to engage the exterior threads 36 on the connector 26, such as the exterior threads on the second section of the exterior threads 36. The annular member 54 also has an outer surface 62.

Illustrative embodiments of the protective device 50 may also include a shield portion 64 which is configured to shield the free end 44 (and the end portion 48) of the fish tape positioned in the interior 14 of the enclosure from conductive contact with elements in the enclosure interior.

In exemplary embodiments, the shield portion 64 may comprise a sleeve member 66 which is configured to receive the end portion 48 of the fish tape that extends into the enclosure interior 14. The sleeve member 66 may have a peripheral wall 68 which extends about a sleeve cavity 70 into which the end portion 48 is able to move. The sleeve member may have a first end 72 attached on the coupler portion 52, and the first end may have a sleeve opening 74 defined in part by an inward surface 76 of the peripheral wall. The sleeve member may also have a second end 78 located on the member 66 opposite of the first end 72.

Optionally, the sleeve member 66 may have a slit 79 which extends between the first 72 and second 78 ends for providing access to the sleeve cavity 70, and in some embodiments, the slit may extend from the first end to the second end. In some illustrative embodiments, hook and loop fastener elements may be provided on the opposite edges that define the slit 79. The hook element and the loop element may be attached together to close the slit opening of the sleeve cavity, and may be detached from each other to open the cavity. In other illustrative embodiments, a zipper may be positioned at the slit 79 to selectively open and close the slit.

Significantly, the second end 78 of the sleeve member may be closed as a blind end to resist or prevent the free end 44 of the fish tape from moving out of the cavity 70 of the sleeve member. In other embodiments, the second end 78 of the sleeve member may be open, such as when the length of the sleeve member 66 between the first and second ends is long enough that closure of the second end 78 is not practically needed since, if the free end of the fish tape is able to pass out of the second end, the second end is likely to be well outside of the interior 14 of the enclosure and unlikely to contact any electrically live elements.

In embodiments, the sleeve member 66 may be elongated between the first 72 and second 78 ends, and in some embodiments, the sleeve member 66 may be extendable in a longitudinal direction between the first and second ends from a collapsed condition (see, e.g., FIG. 5A), which may be suitable for compact storage and transport, and an elongated condition (see, e.g., FIG. 5B), which may be suitable for receiving the end portion of the fish tape during use of the device. The peripheral wall 68 may be formed of a flexible material and may be extendable in an accordion fashion to assume the elongated condition, or may be stretchable to change from the collapsed condition to the elongated condition. The peripheral wall 68 may be formed of a nonconductive material, or may have a nonconductive surface, either on the inside or the outside of the wall 68, to prevent conduction between the tape 42 positioned in the sleeve cavity 70 and elements outside the sleeve member in the enclosure interior 14. Illustratively, the peripheral wall 68 may be formed of a para-aramid synthetic fiber material, such as is available under the tradename KEVLAR from DuPont de Nemours, Inc.

In some highly preferred embodiments, the shield portion 64 is releasably attached on the coupler portion 52 to permit interchange of coupler portions between a single or common shield portion. Such configuration may permit a single shield portion to be used with a plurality of coupler portions having different sizes for engaging different sizes and/or styles of connectors 26 that may be encountered with different electrical infrastructure installations.

Thus, the protective device 50 may comprise a kit that includes at least one shield portion 64 and a plurality of coupler portions 52 with different sizes that are interchangeably attachable on the shield portion. For example, each of the coupler portions 52 of the kit may have a different diameter D for fitting a plurality of commonly encountered sizes of connectors 26. In such embodiments, the first end 72 of the sleeve member is releasably attachable on one of the coupler portions. Each of the coupler portions 52 may include a first releasable attaching component 80 which may be located on the outer surface 62 of the annular member. The shield portion 64 may include a second releasable attaching component 82 located on the inward surface 76 of the sleeve member. The second releasable attaching component 82 on the sleeve member may be releasably attachable to the first releasable attaching component 80 on the annular member to releasably attach the sleeve member to the annular member. In illustrative embodiments, the first 80 and second 82 releasable attaching components may comprise hook and loop fasteners, such as those sold under the VELCRO tradename.

As a further option, a securing strap 84 may be positioned to encircle the first end 72 of the sleeve member, and may be constricted to assist in securing the sleeve member to the annular member 54 of the coupler portion. Illustratively, the securing strap 84 may have an end section that may be overlapped another section of the strap in order to adjust the effective length of the strap about the sleeve member portion to a degree that the strap is snuggly constricted about the first end 72 and presses the second releasable attaching component 82 against the first releasable attaching component 80.

Another aspect of the disclosure relates to a method of utilizing a fish tape 42 to, for example, pivot an electrical conductor through the lumen of the conduit between the near end and the far end of the conduit.

The method may include accessing the electrical infrastructure 10 of a building structure. Illustratively, the infrastructure 10 may include an electrical enclosure 12 having an interior 14, and an electrical conduit 22 connected to the electrical enclosure, with the conduit 22 having a lumen being in communication with the interior of the enclosure. The infrastructure 10 may also include a connector 26 connecting the electrical conduit to an enclosure wall 16 of the enclosure, and the connector may have exterior threads 36 exposed in the interior 14 of the enclosure.

The method of the disclosure may further include mounting a protective device 50 on the electrical infrastructure, and may comprise providing the protective device with a coupler portion 52 and a shield portion 64, positioning the protective device in the interior of the electrical enclosure, and coupling the coupler portion to the connector 26 of the infrastructure. The mounting of the protective device 50 on the infrastructure may include threading interior threads 60 on the coupler portion onto the exterior threads 36 of the connector. Optionally, in some implementations, the mounting of the protective device 50 may comprise selecting a coupler portion 52 of a size suitable to mount on the connector 26 from a plurality of coupler portions having different sizes, and attaching the shield portion 64 onto the selected coupler portion.

The method may also include fishing the fish tape 42 through the conduit 22, and may comprise inserting a free end 44 of the tape into the conduit such that the free end (and end portion 48) moves through the lumen 24 of the conduit and continues to move into the interior 14 of the electrical enclosure. The insertion may be initiated from a remote end 86 of the conduit that is located remote to the enclosure 12. The fishing of the fish tape may also comprise passing the free end 44 of the tape out of a near end 88 of the conduit into a sleeve cavity 70 of the shield portion of the device.

The method may additionally include pulling an elongate element, such as an electrical conductor, in the conduit 22 using the fish tape, and may comprise exposing the free end 42 of the tape in the interior 14 of the enclosure, such as removing at least a portion of the device 50 from the enclosure. The exposing of the free end of the tape may include dismounting the protective device from the connector of the electrical infrastructure, such as by uncoupling the coupler portion from the connector. Optionally, the exposing of the free end may be accomplished by detaching the shield portion 64 from the coupler portion 52. Typically, the removal of a portion or all of the protective device 50, and the exposure of the free end of the fish tape, is performed when the user is present at the enclosure 12 and able to minimize any possibility of the fish tape coming into contact with electrically live elements of the infrastructure in the interior 14. Further, the pulling step may include securing the elongate element to the free end 44 of the tape, and withdrawing the tape back through the conduit from the near end of the conduit toward the remote end 86 to thereby pivot the elongate element with the fish tape back to the conduit.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A protective device for reducing the possibility of accidental electrical discharges to a fish tape during use of the fish tape, the protective device comprising:
   a coupler portion configured to be releasably coupled to a connector of an electrical enclosure of electrical infrastructure, the coupler portion defining a coupler opening; and
   a shield portion defining a cavity configured to receive a free end and an end portion of the fish tape to shield the fish tape from conductive contact with elements in the electrical enclosure, the shield portion being attached to the coupler portion;
   wherein the shield portion comprises a sleeve member having a first end attached to the coupler portion and a second end opposite of the first end, the second end being closed to resist the free end of the fish tape from moving out of the sleeve member; and
   wherein the sleeve member is extendable in a longitudinal direction between the first and second ends from a collapsed condition for storage and an elongated condition for receiving the free end and the end portion of the fish tape.

2. A protective device for reducing the possibility of accidental electrical discharges to a fish tape during use of the fish tape, the protective device comprising:
   a coupler portion configured to be releasably coupled to a connector of an electrical enclosure of electrical infrastructure, the coupler portion defining a coupler opening; and
   a shield portion defining a cavity configured to receive a free end and an end portion of the fish tape to shield the fish tape from conductive contact with elements in the electrical enclosure, the shield portion being attached to the coupler portion;
   wherein the coupler portion comprises an annular member, the annular member having an inner surface defining the coupler opening for receiving a first end portion of the connector, the inner surface having interior threads formed thereon to engage exterior threads on the first end portion of the connector.

3. The device of claim 2 wherein the shield portion comprises a sleeve member having a first end attached to the coupler portion and a second end opposite of the first end, the second end being closed to resist the free end of the fish tape from moving out of the sleeve member.

4. The device of claim 1 wherein the shield portion comprises a sleeve member including a peripheral wall extending about the cavity, the peripheral wall being nonconductive to the fish tape.

5. A protective device for reducing the possibility of accidental electrical discharges to a fish tape during use of the fish tape, the protective device comprising:
   a coupler portion configured to be releasably coupled to a connector of an electrical enclosure of electrical infrastructure, the coupler portion defining a coupler opening; and
   a shield portion defining a cavity configured to receive a free end and an end portion of the fish tape to shield the fish tape from conductive contact with elements in the electrical enclosure, the shield portion being attached to the coupler portion;
   wherein the shield portion comprises a sleeve member being elongated between opposite first and second ends with a peripheral wall extending between the ends, the peripheral wall having a slit extending between the first and second ends for providing access to the sleeve cavity to form a slit opening.

6. The device of claim 5 wherein the slit extends from the first end to the second end of the sleeve member.

7. The device of claim 1 wherein the shield portion is releasably attached to the coupler portion; and
   wherein the protective device includes the single shield portion and a plurality of the coupler portions, each of the coupler portions having an annular member with an inner surface, the inner surface of each of the annular members of the coupler portions having a diameter different from the diameters of other coupler portions of the plurality of coupler portions.

8. The device of claim 7 wherein the coupler portion includes a first releasable attaching component located on an outer surface of the annular member; and
   wherein the shield portion comprises a sleeve member with a sleeve opening having an inner surface, the shield portion including a second releasable attaching component located on the inward surface of the sleeve opening, the second releasable attaching component being releasably attachable to the first releasable attaching component on the annular member to releasably attach the sleeve member to the annular member.

9. The device of claim 1 wherein the coupler portion has a nonconductive surface.

10. The device of claim 1 wherein the shield portion comprising a sleeve member including a peripheral wall, the peripheral wall having a nonconductive surface.

11. The device of claim 1 wherein the coupler portion has a nonconductive surface; and
    wherein the shield portion comprises a sleeve member including a peripheral wall, the peripheral wall having a nonconductive surface.

12. The device of claim 1 wherein the shield portion comprises a sleeve member including a peripheral wall; and
    wherein the coupler portion and the peripheral wall of the shield portion are each formed of a nonconductive material.

13. The device of claim 1 wherein the shield portion is releasably attached to the coupler portion.

14. The device of claim 8 wherein the first and second releasable attaching components comprise hook and loop fasteners.

15. The device of claim 5 wherein the slit in the peripheral wall is formed by opposite edges on the peripheral wall; and
    wherein slit closure elements are provided on the opposite edges that define the slit such that a first fastener element and a second fastener element are attachable together to close the slit opening and are detachable to open the slit opening into the sleeve cavity.

16. The device of claim 15 wherein the first fastener element and the second fastener element of the slit closure elements are formed by a zipper.

17. A protective device for reducing the possibility of accidental electrical discharges to a fish tape during use of the fish tape, the protective device comprising:
    a coupler portion configured to be releasably coupled to a connector of an electrical enclosure of electrical infrastructure, the coupler portion defining a coupler opening; and
    a shield portion defining a cavity configured to receive a free end and an end portion of the fish tape to shield the fish tape from conductive contact with elements in the electrical enclosure, the shield portion being attached to the coupler portion;
    wherein the shield portion comprises a sleeve member having a first end attached to the coupler portion and a second end opposite of the first end, the sleeve member including a peripheral wall extending about the cavity; and
    wherein the peripheral wall is formed of a flexible material and the sleeve member is extendable between the first and second ends into an elongated condition.

18. The device of claim 17 wherein the peripheral wall is configured to be extended in an accordion fashion in the elongated condition.

19. The device of claim 17 wherein the peripheral wall is stretchable to be extended in the elongated condition.

20. A protective device for reducing the possibility of accidental electrical discharges to a fish tape during use of the fish tape, the protective device comprising:
    a coupler portion configured to be releasably coupled to a connector of an electrical enclosure of electrical infrastructure, the coupler portion defining a coupler opening; and
    a shield portion defining a cavity configured to receive a free end and an end portion of the fish tape to shield the fish tape from conductive contact with elements in the electrical enclosure, the shield portion being releasably attached to the coupler portion;
    wherein the shield portion comprises a sleeve member having a first end attached to the coupler portion and a second end opposite of the first end, the sleeve member including a peripheral wall extending about the cavity; and
    wherein the shield portion additionally comprises a securing strap positioned to encircle the first end of the sleeve member, the securing strap being constrictable about the first end of the sleeve member for securing the sleeve member to the coupler portion.

* * * * *